United States Patent
Nakagawa et al.

(10) Patent No.: US 7,819,353 B2
(45) Date of Patent: Oct. 26, 2010

(54) FISHING REEL, FISHING INFORMATION DISPLAY APPARATUS, AND FISHING INFORMATION DISPLAY SYSTEM

(75) Inventors: Shouji Nakagawa, Sakai (JP); Takeshi Ikuta, Sakai (JP); Hiroaki Kuriyama, Sakai (JP); Ken'ichi Kawasaki, Sakai (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 12/400,805

(22) Filed: Mar. 10, 2009

(65) Prior Publication Data

US 2009/0172992 A1 Jul. 9, 2009

Related U.S. Application Data

(62) Division of application No. 11/074,867, filed on Mar. 9, 2005, now Pat. No. 7,559,499.

(30) Foreign Application Priority Data

Mar. 25, 2004 (JP) ............................. 2004-089702

(51) Int. Cl.
*A01K 89/01* (2006.01)
(52) U.S. Cl. ...................... 242/223; 242/323
(58) Field of Classification Search ................. 242/223, 242/323
See application file for complete search history.

(56) References Cited

U.S. PATENT DOCUMENTS

| | | | | |
|---|---|---|---|---|
| 4,620,371 A | * | 11/1986 | Murakami et al. | 33/719 |
| 4,650,161 A | * | 3/1987 | Kaneko | 242/224 |
| 4,790,492 A | | 12/1988 | Atobe | |
| 5,313,845 A | | 5/1994 | Hayashi et al. | |
| 5,465,627 A | | 11/1995 | Garshelis | |
| 5,483,767 A | * | 1/1996 | Langer | 43/4 |
| 5,503,341 A | * | 4/1996 | Kaneko et al. | 242/223 |
| 5,511,335 A | * | 4/1996 | Langer | 43/4 |
| 5,546,695 A | * | 8/1996 | Langer | 43/44.98 |
| 5,560,560 A | * | 10/1996 | Hirose | 242/223 |
| 5,581,930 A | * | 12/1996 | Langer | 43/17 |
| 5,639,038 A | | 6/1997 | Hirose | |

(Continued)

FOREIGN PATENT DOCUMENTS

JP  H03-122663 U  12/1991

(Continued)

*Primary Examiner*—Emmanuel M Marcelo
(74) *Attorney, Agent, or Firm*—Global IP Counselors, LLP

(57) ABSTRACT

A fishing reel has a reel unit that is mounted on the fishing rod, a spool that is rotatably attached to the reel unit, a tension detector that detects tension applied to the said fishing line, and a communication portion that transmits to a fishing information display apparatus data of the tension applied to the fishing line detected by the tension detector. The fishing information display apparatus is provided externally of a fishing reel, and receives data communicated from the fishing reel. The fishing information display apparatus includes a body member, a display portion provided in the body member, a communication portion that receives from the fishing reel data of the tension applied to the fishing line, and a controller that is displays on the display portion the data of tension received from the fishing reel. A navigator away from an angler can certainly have information of the fishing situation.

5 Claims, 13 Drawing Sheets

U.S. PATENT DOCUMENTS

| | | | |
|---|---|---|---|
| 6,032,891 A * | 3/2000 | Chang | 242/223 |
| 6,053,443 A * | 4/2000 | Nanbu et al. | 242/223 |
| 6,056,218 A * | 5/2000 | Nanbu | 242/223 |
| 6,126,103 A | 10/2000 | Nanbu | |
| 6,561,033 B2 * | 5/2003 | Nanbu et al. | 73/597 |
| 6,851,636 B2 * | 2/2005 | Nanbu | 242/223 |
| 7,108,213 B2 * | 9/2006 | Hitomi et al. | 242/223 |
| 7,161,872 B2 * | 1/2007 | Kuriyama et al. | 367/111 |
| 7,188,793 B2 * | 3/2007 | Ikuta et al. | 242/223 |
| 7,434,757 B2 * | 10/2008 | Beckham | 242/223 |
| 7,461,805 B2 * | 12/2008 | Ikuta et al. | 242/223 |
| 2004/0104863 A1 | 6/2004 | Hitomi et al. | |

FOREIGN PATENT DOCUMENTS

| | | |
|---|---|---|
| JP | H08-205732 A | 8/1996 |
| JP | H09-074960 A | 3/1997 |
| JP | 2000-262196 B1 | 9/2000 |
| JP | 2002-027878 A | 1/2002 |
| JP | 2002-262738 A | 9/2002 |
| JP | 2003-274823 A | 9/2003 |

* cited by examiner

FISHING REEL, FISHING INFORMATION DISPLAY APPARATUS, AND FISHING INFORMATION DISPLAY SYSTEM

CROSS-REFERENCE TO RELATED APPLICATIONS

This application is a Divisional Application of U.S. patent application Ser. No. 11/074,867 filed on Mar. 9, 2005 now U.S. Pat. No. 7,559,499. The entire disclosure of U.S. patent application Ser. No. 11/074,867 is hereby incorporated herein by reference.

This application also claims priority to Japanese Patent Application No. 2004-089702. The entire disclosure of Japanese Patent Application No. 2004-089702 is hereby incorporated herein by reference.

BACKGROUND OF THE INVENTION

1. Field of the Invention

The present invention relates to a fishing reel. More specifically, the present invention relates to a fishing reel that is adapted to be attached to a fishing rod for winding and releasing fishing line.

2. Background Information

Generally, a fishing reel has a reel unit, a spool rotatably attached to the reel unit, and a handle for rotating the spool. The spool is attached to a spool shaft supported by the reel unit. The handle is non-rotatably attached to a handle shaft, which is disposed in parallel with the spool shaft.

In this type of fishing reel, a trolling reel, which is a relatively large dual-bearing reel for so-called big game fishing of big fish such as swordfish and tuna, is known. Japanese Patent Application Publication 2000-262196 discloses an example of such trolling reel.

In fishing with this type of trolling reel, an angler catches a fish by trailing terminal tackle connected to fishing line from a moving boat so that the terminal tackle follows behind the boat. Generally, such a boat is equipped with a fish finder. A navigator verbally gives the angler information acquired by the fish finder, such as the state of sea floor, and fish water depth. Thus, the angler trails a lure at the fish water depth based on the information. In return, the angler verbally gives the navigator information about the current fishing situation, or whether a fish strikes, such that the navigator can change the boat speed or the travel direction of the boat based on the information.

When above conventional trolling reel is used, information such as the current fishing situation, or whether a fish strikes can be conveyed only verbally from the angler to the navigator. Accordingly, it is difficult for the navigator who is far from the angler to acquire the information, in the case, for example, where the angler is fighting as a fish strikes. Particularly when a fish strikes, frequent connection is necessary between the angler and the navigator to suitably change the boat speed or the travel direction of the boat through cooperation between the angler and the navigator. However, such information of the current fishing situation or whether a fish strikes is not conveyed to the navigator properly, the navigator cannot suitably change the boat speed, or the travel direction of the boat. This may affect the fishing result.

In view of the above, it will be apparent to those skilled in the art from this disclosure that there exists a need for an improved fishing reel, fishing information display apparatus, and fishing information display system that overcome the problems of the conventional art. This invention addresses this need in the art as well as other needs, which will become apparent to those skilled in the art from this disclosure.

SUMMARY OF THE INVENTION

An object of the present invention is to allow a navigator who is far from an angler to acquire information from the angler in a reliable manner.

A fishing reel according to a first aspect of the invention a fishing reel that is configured to communicate with an external apparatus and adapted to be attached to a fishing rod to wind and release a fishing line. The fishing reel includes a reel unit, a spool, a handle, a tension detector, and a communication portion. The reel unit is adapted to be mounted on the fishing rod. The spool is rotatably attached to the reel unit. The fishing line is adapted to be wounded around the spool. The handle is provided in the reel unit and rotates the spool. The tension detector is configured to detect tension applied to the said fishing line. The communication portion is configured to transmit to the external apparatus data of the tension applied to the fishing line detected by the tension detector.

This fishing reel has the tension detector that detects the tension applied to the fishing line, and the communication portion that can transmit the data of the tension applied to the fishing line. In this case, a navigator who is positioned away from an angler can have a fishing information display apparatus at hand, for instance, in which the tension applied to the fishing line is displayed. Accordingly, the navigator can certainly have information on the tension applied to the fishing line, that is, information of whether a fish strikes or the current fishing situation such as a condition of pull of a fish in real time.

A fishing reel according to a second aspect of the invention is the fishing reel according to the first aspect of the invention, in which the tension detector includes a torque sensor that detects a torque applied to the spool. In this case, for example, the torque sensor is provided on a spool shaft that rotates in cooperation with the spool, and detects the torque applied to the spool. Accordingly, it is possible to easily detect the tension applied to the fishing line corresponding to the torque applied to the spool.

A fishing reel according to a third aspect of the invention is the fishing reel according to the second aspect of the invention, further including a drag mechanism that brakes the rotation of the spool. The torque sensor detects the torque applied to the drag mechanism. In this case, for example, the torque applied to the drag mechanism such as a star drag attached to a handle shaft, or a lever drag attached to a spool shaft, is detected. Accordingly, it is possible to accurately detect the tension applied to the fishing line corresponding to the torque applied to the drag mechanism.

A fishing reel according to a fourth aspect of the invention is the fishing reel according to the third aspect of the invention, further including a one-way clutch that is adapted to selectively prohibit reverse rotation of the spool in a line-releasing direction. The torque sensor is attached between the one-way clutch and the drag mechanism. In this case, the torque sensor is attached to a spool shaft or a handle shaft between the one-way clutch and the drag mechanism, for example. Accordingly, it is possible to easily detect the torque applied to the drag mechanism.

A fishing reel according to a fifth aspect of the invention is the fishing reel according to the third or fourth aspect of the invention, in which the torque sensor includes a magnetostrictor magnetic that is designed to change its permeability depending on the torques applied to the drag mechanism, and a detection coil that is provided in a periphery of the magnetostrictor and configured to electrically detect the change in the magnetic permeability. In this case, since the torque can be detected only by providing a magnetostrictor that can be composed of a thin film or the like on a spool shaft or a handle shaft, and the detection coil in its periphery, it is not necessary to provide an electric device on a rotation part. Accordingly, it is possible to detect the torque in a non-contact manner. As a result, it is possible to provide easy electric wiring of the torque sensor, and compact construction of torque sensor.

A fishing reel according to a sixth aspect of the invention is the fishing reel according to any of the first to fifth aspects of the invention, further including a speed detector that is configured to detect a rotational speed of the spool. The communication portion is configured to transmit to the external apparatus data of the rotational speed of the spool detected by the speed detector. In this case, for example, when an externally-provided fishing information display apparatus displays the rotational speed of the spool, a navigator can have information of the speed of rotation of the spool.

A fishing reel according to a seventh aspect of the invention is the fishing reel according to any of the first to sixth aspects of the invention, further including a water depth sensor that is configured to measure the water depth of a terminal tackle attached to the fishing line. The communication portion is configured to transmit to the external apparatus data of the water depth of the terminal tackle measured by the water depth sensor. In this case, for example, when an externally-provided fishing information display displays the water depth of the terminal tackle, a navigator can have information of the location of the terminal tackle.

A fishing reel according to an eighth aspect of the invention is the fishing reel according to the sixth aspect of the invention, further including a water depth sensor that is configured to measure the water depth of a terminal tackle attached to the fishing line. The communication portion is configured to transmit to the external apparatus data of the rotational speed of the spool detected by the speed detector and data of the water depth of the terminal tackle measured by the water depth sensor.

A fishing reel according to an eighth aspect of the invention is the fishing reel according to any of the first through eight aspects of the invention, wherein the communication portion is configured to transmit data wirelessly. In this case, for example, when the fishing reel is connected to an externally provided fishing information display by using a wireless method such as UWB (Ultra Wideband) or Bluetooth, a code for cable connection is not required.

A fishing information display apparatus according to a tenth aspect of the invention is provided externally of a fishing reel, the fishing information display apparatus being configured to receive data communicated from the fishing reel. The fishing information display apparatus includes a body member, a display portion, a communication portion, and a controller. The display portion is provided in the body member. The communication portion is configured to receive from the fishing reel data of tension applied to the fishing line. The controller is configured to display on the display portion the data of tension received from the fishing reel.

This fishing information display can display on the display portion the tension applied to the fishing line provided from the fishing reel. In this case, a navigator who is positioned away from an angler can have a fishing information display at hand. Accordingly, the navigator can certainly know the tension applied to the fishing line, that is, information on whether a fish strikes or current fishing situation such as a condition of pull of a fish in real time.

In a fishing information display apparatus according to an eleventh aspect of the invention, in the fishing information display according to the tenth aspect of the invention, in which the communication portion is configured to receive from the fishing reel data of rotational speed of a spool, and the controller is configured to display on the display portion the data of rotational speed of the spool. In this case, for example, the rotational speed of the spool is displayed on the display portion. Accordingly, a navigator can know the situation of the spool rotation.

A fishing information display apparatus according to a twelfth aspect of the invention is the fishing information display according to the tenth or eleventh aspect of the invention, in which the communication portion is configured to receive from the fishing reel data of rotational water depth of a terminal tackle attached to fishing line, and the controller is configured to display on the display portion the data of rotational water depth of the terminal tackle. In this case, the water depth of the terminal tackle is displayed on the display portion. Accordingly, a navigator can know the situation of the terminal tackle.

A fishing information display according to a thirteenth aspect of the invention is the fishing information display according to any of the tenth to twelfth aspects of the invention, in which the communication portion is further configured to receive data from a fish finder that is provided externally of the fishing information display apparatus, and the controller is further configured to display on the display portion the data from the fish finder. In this case, fish-finding information can be displayed on the display portion.

A fishing information display apparatus according to a fourteenth aspect of the invention is a fishing information display according to the tenth aspect of the invention, further including a fish finder portion that is configured to obtain fish location data. The controller is further configured to display on the display portion the fish location data from the fish finder portion. Generally, a monitor of fish finder is provided in navigator's room. In this case, the monitor of fish finder can also serve as the fishing information display.

A fishing information display system according to a fifteenth aspect of the invention includes a fishing reel and a fishing information display apparatus. The fishing reel is adapted to be attached to a fishing rod to wind and release a fishing line, and includes a reel unit, a spool, a handle, a tension detector, and a communication portion. The reel unit is adapted to be mounted on the fishing rod. The spool is rotatably attached to the reel unit, the fishing line being adapted to be wounded around the spool. The handle is provided in the reel unit to rotate the spool. The tension detector is configured to detect tension applied to the said fishing line. The communication portion is configured to transmit data of the tension applied to the fishing line detected by the tension detector. The fishing information display apparatus is provided externally of a fishing reel, and configured to receive data communicated from the fishing reel. The fishing information display apparatus includes a body member, a display portion, a communication portion, and a controller. The display portion is provided in the body member. The communication portion is configured to receive from the fishing reel data of tension applied to the fishing line. The controller is configured to display on the display portion the data of tension received from the fishing reel.

This fishing information display system can display the tension applied to the fishing line provided from the communication portion of the fishing reel on the display portion of the fishing information display apparatus. In this case, a navigator who is away from an angler can have a fishing information display apparatus at hand. Accordingly, the navigator can certainly know the tension applied to the fishing line, that is, information on whether a fish strikes or current fishing situation such as a condition of pull of a fish in real time.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
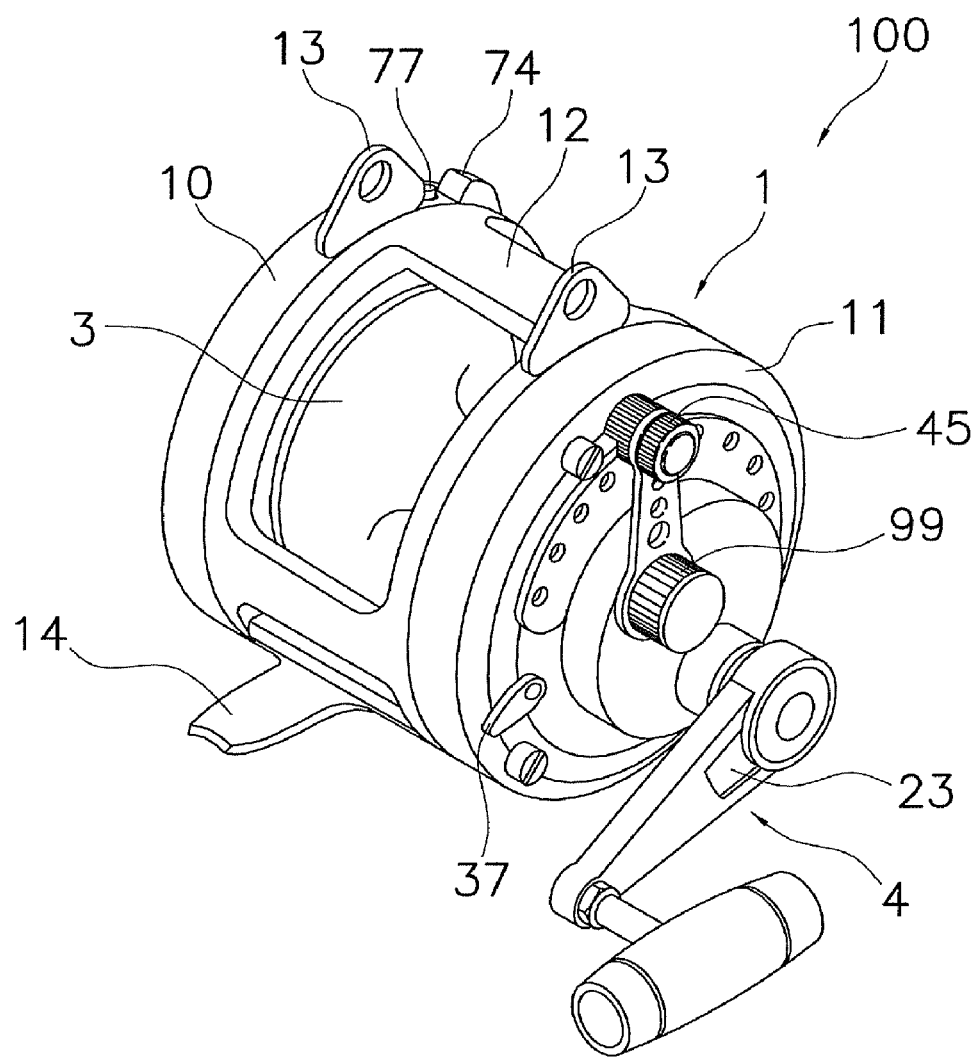
FIG. 1 is a perspective view of a fishing reel in accordance with an embodiment of the present invention.
Figure 2:
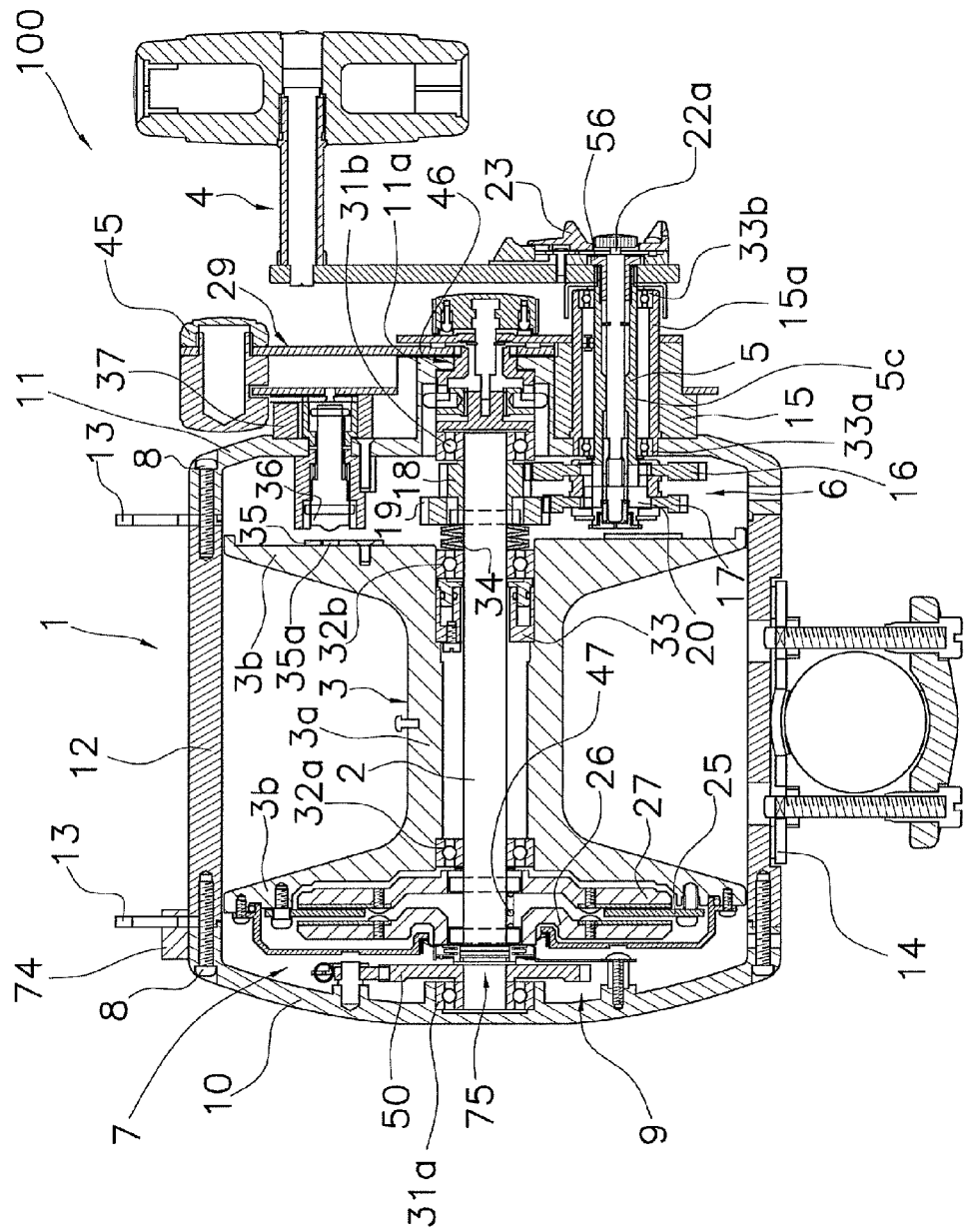
FIG. 2 is a cross-sectional view of the fishing reel in accordance with the embodiment of the present invention.

A fishing reel 100, which is in accordance with one embodiment of the present invention, is a large dual-bearing reel used for trolling, as shown in FIGS. 1 and 2. A dual-bearing reel 100 is furnished with: a cylindrical reel unit 1, a spool shaft 2 mounted rotatably in the central part of the reel unit 1, a spool 3 rotatably but axially immovably supported on the spool shaft 2, and a handle 4 disposed laterally on the reel unit 1. Likewise, within the reel unit 1 interior, the fishing reel 100 is furnished with: a torque-transmitting mechanism 6 that transmits torque from the handle 4 to the spool 3; a lever-drag mechanism 7 that brakes rotation of the spool 3 in the line-releasing direction; and an anti-reverse mechanism 9 that controls rotation of the spool 3 in the line-releasing direction.

The reel unit 1 has: a left/right pair of plate-shaped first and second side plates 10 and 11 made of metal; and a perforated cylindrical reel unit 12 made of metal, to either end of which the first and second side plates 10 and 11 are joined coaxially by spigot joints and fastened by a plurality of fixing screws 8. The approximately central portions of the first and second side plates 10 and 11 rotatably support either end of the spool shaft 2. A boss 11a protruding axially outward is disposed in the second side plate 11 in the handle 4 side for supporting the spool shaft 2; and on the periphery of the boss 11a, a thick-walled, disk-shaped bearing block 15 for mounting the handle shaft 5 of the handle 4 is screwed fast.

Harness lugs 13 for attachment to a reel harness are mounted with a space between them on the upper part, both between the reel body 12 and the first side plate 10, and between the reel body 12 and the second side plate 11. The under portion of the reel unit 12 is provided with a rod attachment part 14 for mounting the reel onto a fishing rod. As shown in FIGS.-1 and 2, an information communication portion 74 and a switch operation portion 77 are mounted so as to be exposed in the front part of the first side plate 10 of the reel unit 1. The information communication portion 74 can wirelessly provide information of the water depth of terminal tackle to a later described fishing information display apparatus 80 (see FIGS. 8 and 9) that is provided externally of the fishing reel 100. The switch operation portion 77 turns the information communication portion 74 ON/OFF.

The spool shaft 2 is rotatably supported in the first and second side plates 10 and 11 on the reel unit 1 with a pair of left and right bearings 31a, 31b disposed at either end. Also, spaced axially inward thereof are two bearings 32a, 32b disposed at either end of the spool 3, by which the spool 3 is rotatably supported. The components of a later-described moving mechanism 29 for the lever-drag mechanism 7 adjoin the right side of the bearing 31b outer race, which is on the right end of the spool shaft 2. Additionally, a later-described third gear for the rotation transmission mechanism 6 adjoins the left side of the inner race. The reverse rotation check mechanism 9 adjoins the right side of the bearing 31a inner race on the left end of the spool shaft 2. Further, the first side plate 10 abuts the right end of the outer race. The spool 3 abuts on the left side of the outer race of the right-side bearing 32b that supports the spool 3 via a hydrothermal drag mechanism 33. Further, disk springs 34 abut on the right side of the inner race via a washer (not shown). The disk springs 34 are provided in order to make the drag force adjustable over a broad range with respect to pivot of a later-described brake operating lever, without the drag force elevating abruptly. A later-described second disk plate in the lever drag mechanism 7 abuts on the left side of the inner race of the left-side bearing 32a that supports the spool 3. The right side of the outer race of the left-side bearing 32a abuts on the spool 3.

The spool 3 has a bobbin trunk 3a, and flanges 3b that are formed integrally with the bobbin trunk 3a on either end. A sound-emitting ring 35 is disposed on the end surface of the right-side flange portion 3b. The sound-emitting ring 35 has many sound-emitting holes 35a arranged in the circumferential direction for emitting sound during drag operation. A sound-emitting pin 36 attached on the second side plate 11 is opposed to the sound-emitting hole 35a of the sound-emitting ring 35. This sound-emitting pin 36 is urged toward the protruding side. The sound-emitting pin 36 can shift between an advancing position and a retreating position by the lever 37 (see FIG. 3), and is normally positioned at the advancing position by the lever 37 except when the terminal tackle is cast. Accordingly, a click sound is normally emitted when the spool 3 rotates.

Figure 4:
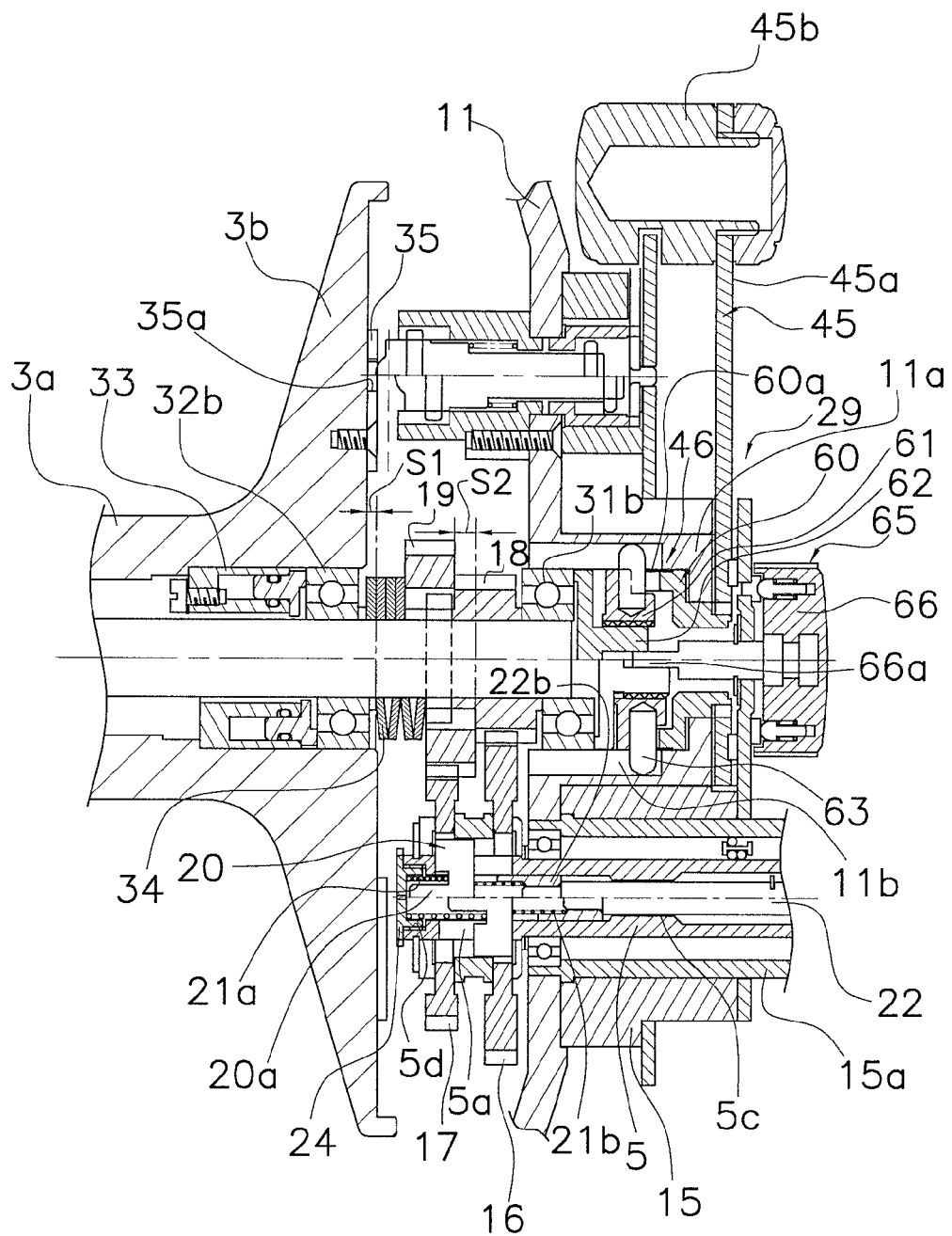
FIG. 4 is a cross-sectional enlarged view of the right part of the fishing reel in accordance with the embodiment of the present invention.

The handle 4 is fixedly coupled to the protruding end of the tubular handle shaft 5, which is disposed below the spool shaft 2 and parallel with the spool shaft 2. The handle shaft 5 is rotatably supported by the two bearings 33a and 33b that are disposed under the boss portion 11a and spaced apart from each other in the axial direction. The bearings 33a and 33b are mounted on the both ends of the inner peripheral surface of a cylindrical member 15a inserted into the bearing block 15 below the boss portion 11a. As shown in FIG. 4, a slit 5a penetrating in the axial direction is formed at the fore end of the handle shaft 5. A female screw 5d is formed on the fore end of the interior surface of the handle shaft 5.

The rotation transfer mechanism 6 has a change-speed mechanism that can switch between two speeds (high and low speeds). As shown in FIGS. 2 and 4, the rotation transmission mechanism 6 has first, second, third and fourth gears 16, 17, 18 and 19, an engaging member 20, two compressing springs 21a and 21b, and an operation shaft 22. The first gear 16 for high-speed winding and the second gear 17 for low-speed winding are rotatably supported by the handle shaft 5 of the handle 4. The third and fourth gears 18 and 19 are non-rotatably attached to the spool shaft 2 in the state where they mesh with the first and second gears 16 and 17, respectively. The engaging member 20 couples with one of first and second gears 16 and 17 to transmit the rotation. The two compression springs 21a and 21b position the engaging member 20 at the both sides of the engaging member 20. The operation shaft 22 sets the position of the engaging member 20.

The engaging member 20 is non-rotatably disposed in the slit 5a of the handle shaft 5. A protrusion portion 20a is provided in the central part of the engaging member 20. The protrusion portion 20a is provided in the inner peripheral side of a flange-shaped spring holder 24 that receives the compression spring 21a. The spring holder 24 is fastened to the fore end of the handle shaft 5 by screwing.

The operation shaft 22 penetrates the handle shaft 5 in the interior of the handle shaft 5 and protrudes outwardly. The operation shaft 22 is supported movably in the axial direction by a guiding portion 5b that is screwed at the protruding end of the handle shaft 5, and a guiding portion 5c that is formed on a central part of the inner peripheral surface of the handle shaft 5. A groove 22a is formed at the outward protruding end of the operation shaft 22. A slid type stopper 23 that engages with the groove 22a is provided on the handle 4. A spring holder member 22b that receives the compression spring 21b is attached to the opposite end of the operation shaft 22.

In the rotation transmission mechanism 6 with this configuration, when the operation shaft 22 is pressed as shown in FIG. 2 and the upper part relative to the center axis of the operation shaft 22 of FIG. 4, the engaging member 20 is positioned at the second gear 17, and the rotation of the handle 4 is transmitted to the fourth gear 19 via the second gear 17. Thus, the spool shaft 2 and spool 3 rotate at low speed. On the other hand, when the operation shaft 22 is pulled outwardly by sliding the slide-type stopper 23 as shown in the lower part relative to the center axis of the operation shaft of FIG. 4, the engaging member 20 is positioned at the first gear 16, and the rotation of the handle 4 is transmitted to the third gear 18 via the first gear 16. Thus, the spool shaft 2 and spool 3 rotate at high speed.

As shown in FIG. 2, the lever drag mechanism 7 has a braking disk 25, a pair of friction disks 26 and 27, coil springs 28, and a moving mechanism 29. The braking disk 25 is attached to the left end (in view of FIG. 2) of spool 3. The pair of friction disks 26 and 27 are arranged at the both sides of the braking disk 25. The coil spring 28 (see FIG. 6), which is an example of the urging means, urges the braking disk 25 from the spool 3 in the direction that is away from the friction disk 27. The moving mechanism 29 oscillates the spool 3 and the friction disk 27 in the axial direction of the spool shaft 2.

Figure 5:
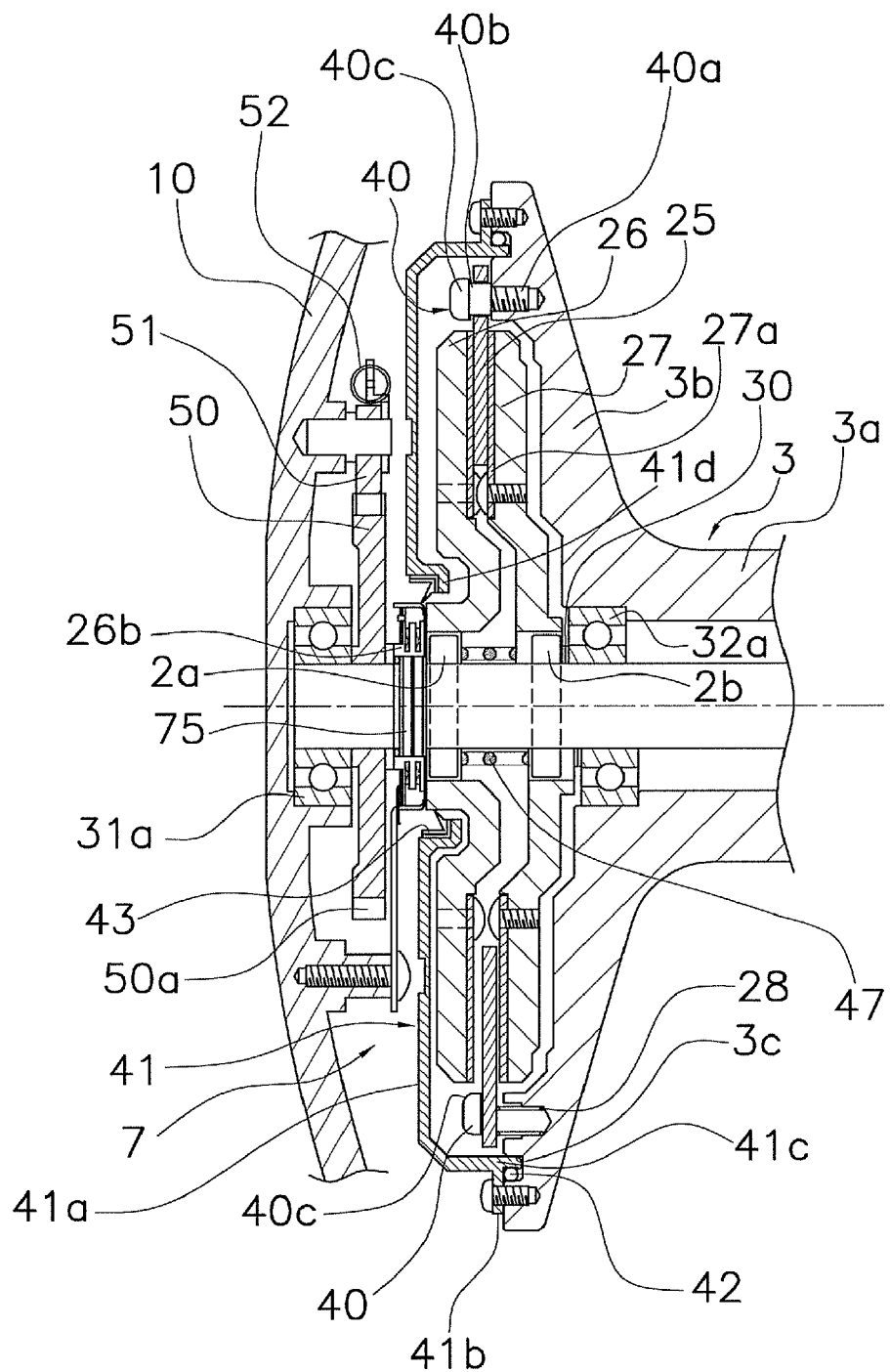
FIG. 5 is a cross-sectional enlarged view of the left part of the fishing reel in accordance with the embodiment of the present invention.

As shown in FIG. 5, the brake disk 25 is for example a washer-shaped disk member made of stainless steel, and is mounted movably in the direction of contact/noncontact with the spool 3, and non-rotatably with respect to the spool 3 on the end face of the left-side flange 3b on the spool 3 with a plurality of attaching pins 40 that are spaced at circumferential intervals. The attaching pin 40 has a threaded portion 40a to be screwed on the end face of the of flange portion 3b, a guiding portion 40b with a diameter larger than the threaded portion 40a, and a head portion with a diameter larger than the guiding portion 40b. The braking disk 25 is attached to the guiding portion 40b of the attaching pin 40 so as to be movable in the axial direction. Thus, the braking disk 25 can move by a predetermined distance, which is obtained by subtracting the thickness of the braking disk 25 from the axial direction length of the guiding portion 40b. These attaching pins 40 serve as both a rotation-stopping member and a restriction member for the braking disk 25. The braking disk 25 is urged by the coil springs 28 in the brake-release state, and thus is positioned at a position in contact with the head portion 40c. It is noted that FIGS. 4 and 5 show the braking state in the upper part relative to the center axis of the spool shaft, and the brake-release state in lower part.

The friction disk 26 is disposed on a face of the brake disk 25 that is on the side opposite from the spool 3. A ring-shaped friction plate 26a made of abrasion-resistant material, e.g., carbon graphite or fiber-reinforced resin, is fastened to the surface of the friction disk 26 that opposes the brake disk 25, by a suitable fastening member such as screws. In the central portion of the friction disk 26 is a cylindrical boss portion 26b; and a pin 2a, which is fitted into the spool shaft 2, passing through the spool shaft 2 diametrically, interlocks with the boss portion 26b. Accordingly, the friction disk 26 is mounted on the spool shaft 2 non-rotatably, and rotates together with the spool shaft 2. Further, a ratchet wheel 50 in the reverse rotation check mechanism 9 is in contact with the left-end surface (in view of FIG. 5) of the boss portion 26b on the friction disk 26. The ratchet wheel 50 is attached non-rotatably to the outer periphery surface of the boss portion 26b by a suitable interlocking structure, such as serration. The ratchet wheel 50 adjoins the inner race of the bearing 31a. The outer race of the bearing 31a adjoins the first side plate 10, as mentioned above. As a result, the friction disk 26 cannot shift in the axially outward direction (leftward in FIG. 5) of the spool shaft 2 i.e., in the direction moving away from the brake disk 25; and it is prohibited by the ratchet wheel 50 from rotating in the line-releasing direction.

The reverse rotation check mechanism 9 is a ratchet-type mechanism including the ratchet wheel 50 provided with saw teeth 50a at its periphery, and a ratchet pawl 51 that interlocks with the tip of the saw teeth 50a and is disposed on the outer periphery of the ratchet wheel 50. The ratchet pawl 51 is pivotably attached in the internal surface of the first side plate 10, and is urged by an extended spring toward the side that interlocks with the saw teeth 50a.

The friction disk 27 is disposed on a face of the braking disk 25 on the spool 3 side, and is attached to the spool shaft 2 so as to be movable in the axial direction of the spool 3 and rotatable in association with rotation of the friction disk 26 to come in contact with and move away from the friction disk 26. A ring-shaped friction plate 27a made of abrasion-resistant material, e.g., carbon graphite or fiber-reinforced resin, is fastened by screwing to the surface of the friction disk 27 that opposes the brake disk 25. The friction disk 27 is non-rotatably attached to the spool shaft 2 at the center by a pin 2b that penetrates along the axial direction of the spool shaft 2 and is mounted to the spool shaft 2. Further, the inner race of bearing 32a adjoins the right-end surface (in view of FIG. 5) of the friction disk 27 via a washer 30. As a result, the friction disk 27 and the spool 3 urge one another via the bearing 32a, while it urges the spool 3.

Figure 6:
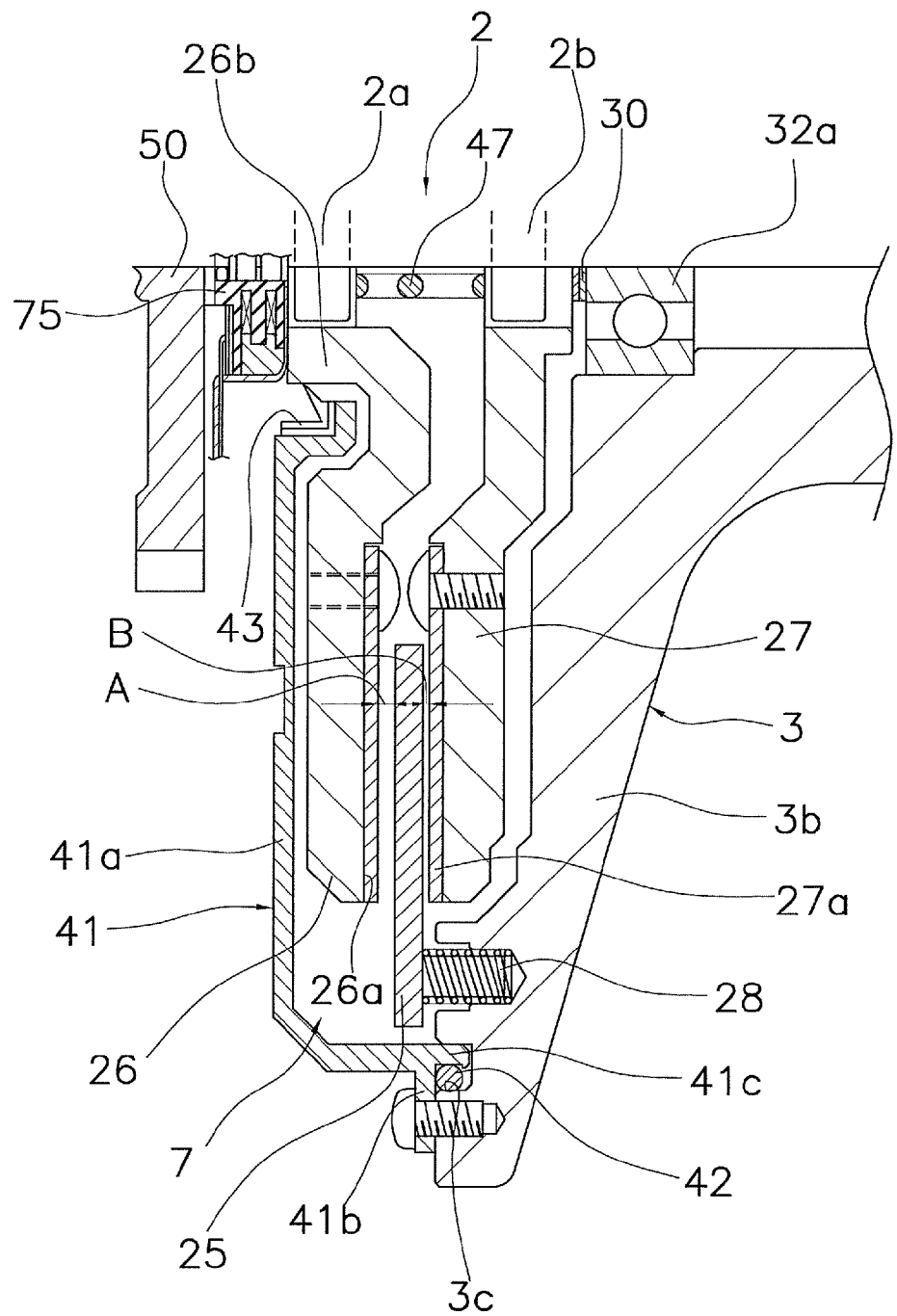
FIG. 6 is a partial sectional view of a lever drag mechanism in accordance with the embodiment of the present invention.

In the brake-release state, as shown in FIG. 6, the gap A between the friction plate 26a of the friction disk 26 and the braking disk 25 is larger than the gap B between the friction plate 27a of the friction disk 27 and the braking disk 25. This reason will be described in braking operation mentioned later.

A drag cover 41 covers the outside of friction disk 26. The drag cover 41 is made of an aluminum alloy, for example, taking heat dissipation into account. The drag cover 41 has a plate-shaped cover body 41a with the circular opening at the center, and a ring-shaped attachment portion 41b formed unitarily with the cover body 41a on the outer periphery surface. The cover body 41a has a space in the interior thereof that can accommodate the friction disks 26 and 27, and the braking disk 25. The attachment portion 41b is secured to the end surface of the flange portion 3b of the spool 3 with a suitable securing member such as a plurality of screws. When the cover is secured with a plurality of screws as mentioned above, control of torque for tightening is easy as compared with the case where the entire cover is secured to the spool by screwing. Accordingly, assembly can be easy.

A cylindrical seal portion 41c that protrudes from the spool side end surface toward the spool 3 side is provided on the attachment portion 41b. An annular groove 3c is formed on the end surface of the flange portion 3b in the left-hand side of spool 3. The seal portion 41c is inserted in this annular groove 3c. When the seal portion 41c is inserted in this annular groove 3c, the spool 3 and the drag cover 41 are centered by the inner peripheral surface of the seal portion 41c. An O-ring 42 is attached to the outer periphery surface of seal portion 41c, thus, the infiltration of liquid from the outer periphery side is prevented.

A seal portion 41d that protrudes toward the friction disk 26 side is provided on the inner peripheral surface of the cover body 41a. A seal member 43 with a lip is attached to the seal portion 41d. The fore end of the lip of the seal member 43 is in contact with the outer periphery surface of the boss portion 26b of the friction disk 26. Accordingly, the infiltration of liquid from the inner circumference side is also prevented. These O-ring 42 and seal member 43 seal the drag cover 41, the spool 3, the drag cover 41, and the friction disk 26, and thus seal the inside of the drag cover 41 watertight, in which the braking disk 25, and the friction disks 26 and 27 are provided. Combining the O-ring 42 and the seal member 43 can achieve a reliable drag waterproof structure. In order to provide easy attachment of the O-ring 42, an attachment groove for the O-ring 42 may be provided in the seal portion 41c.

Figure 3:
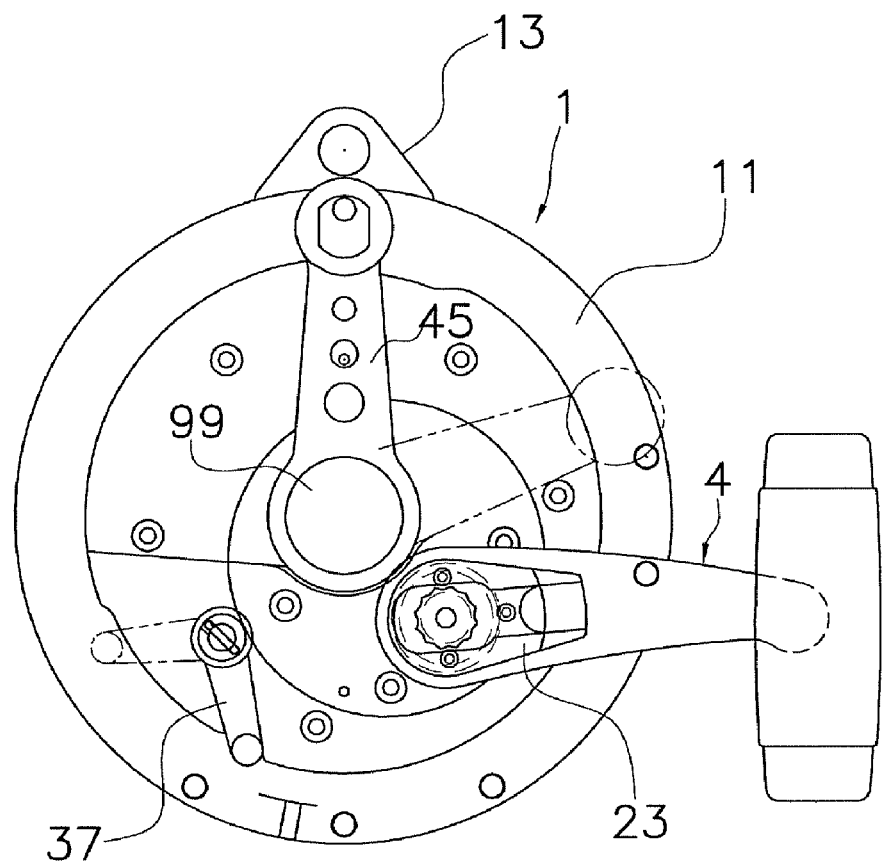
FIG. 3 is a side view of the fishing reel in accordance with the embodiment of the present invention.

As shown in FIGS. 3 to 5, the moving mechanism 29 includes: a brake handling lever 45 provided pivotally on the reel unit 1; a pressing mechanism 46, which, in response to pivoting the brake handling member clockwise in FIG. 3, presses against the spool 3 and the friction disk 27 and shifts them leftward in FIG. 4; and a return spring 47, which urges the friction disk 27 to shift the spool 3 and the friction disk 27 rightward in FIG. 4 in response to the brake handling lever 45 moving counterclockwise in FIG. 3.

The return spring 47 is fitted circumferentially about the spool shaft 2, in the compressed state in between the both friction disks 26 and 27, and urges the both friction disks 26 and 27 into the separate directions, urging the friction disk 27 and the spool 3 rightward in FIG. 5.

The brake-handling lever 45 is mounted to the reel unit 1 so as to be pivotable between the brake release position, indicated by solid lines in FIG. 3, and the maximum braking position, indicated by phantom lines. The brake-handling lever 45 includes a lever portion 45a that is pivotally mounted to the boss portion 11a, and a knob portion 45b that is fastened to the fore end of the lever portion 45a. The basal end of the lever portion 45a interlocks non-rotatably with the pressing mechanism 46, which composes a first cam member 60.

The pressing mechanism 46 has the first cam member 60, a second cam member 61, a pressing member 62, and a pressure adjustment mechanism 65. The first cam member 60 is attached to the inner peripheral surface of the boss portion 11a rotatably but non-movably in the axial direction. The second cam member 61 moves in the axial direction by the pivoting of the first cam member 60. The pressing member 62 moves in the axial direction in cooperation with the second cam member 61. The pressure adjustment mechanism 65 adjusts the pressure by the pressing member 62.

The first cam member 60 is a cylindrical member with two large/small levels, which pivots in cooperation with the pivoting of the brake-handling lever 45. The base end of the lever portion 45a of the brake-handling lever 45 is non-rotatably interlocked with the outer periphery surface of the small diameter level of the first cam member 60 in the fore end side (rightward in FIG. 4) by a suitable interlocking structure, such as serration. A slant cam 60a is formed on the end surface of the large diameter level in the base end side of the first cam member 60.

The second cam member 61 is a cylindrical member, and is attached to the inner peripheral surface of the boss portion 11a non-rotatably but movably in the axial direction. A slant cam 61a, which engages with the slant cam 60a, is formed on the end surface of the second cam member 61 in the outer periphery side opposing the first cam member 60. Pivot movement of the first cam member 60 is converted into rectilinear movement of the second cam member 61 in the axial direction by the relative pivoting of these two slant cams 60a and 61a. Thus, the second cam member 61 moves in the axial direction. Two interlocking pins 63 protruding in the axial direction are provided to the second cam member 61. The fore ends of the interlocking pins 63 are interlocked with interlock grooves 11b, which are formed on the inner peripheral surface of boss portion 11a along the axial direction, and thus non-rotatably interlock the second cam member 61 with the boss portion 11a. The inner peripheral surface of the second cam member 61 is screwed into the pressing member 62. Accordingly, it is possible to adjust relative positional relationship in the axial direction between the second cam member 61 and the pressing member 62, and to adjust the drag force in a predetermined position of the brake-handling lever 45.

The pressing member 62 is a cylindrical member having a brim. The outer periphery surface of the cylindrical part of the pressing member 62 is screwed into the second cam member 61. The left-end surface (in view of FIG. 4) of the brim part slightly protrudes. This protruding part adjoins the outer race of the bearing 32b.

The pressure adjustment mechanism 65 has an adjusting knob 66 whose end portion 66a is interlocked with the center of the pressing member 62 non-rotatably but movably in the axial direction. The adjusting knob 66 is attached to the reel unit 1 rotatably around the center axis of the spool shaft 2, and is configured to emit click sound by the rotation. When the adjusting knob 66 is rotated, the pressing member 62 pivots. Thus, the relative position in the axial direction between the pressing member 62 and the second cam member 61 screwed into the pressing member 62 changes. Accordingly, it is possible to adjust the drag force in case where the brake-handling lever 45 is in a predetermined position. It is noted that FIG. 4 shows the state where the pressing member 62 comes in contact with the second cam member 61 to adjust the pressure to the minimum in the lower part relative to the center axis of the spool shaft 2, and the state where the pressing member 62 is spaced away from the second cam member 61 at the maximum distance to adjust the pressure to the maximum in the upper part.

Figure 8:
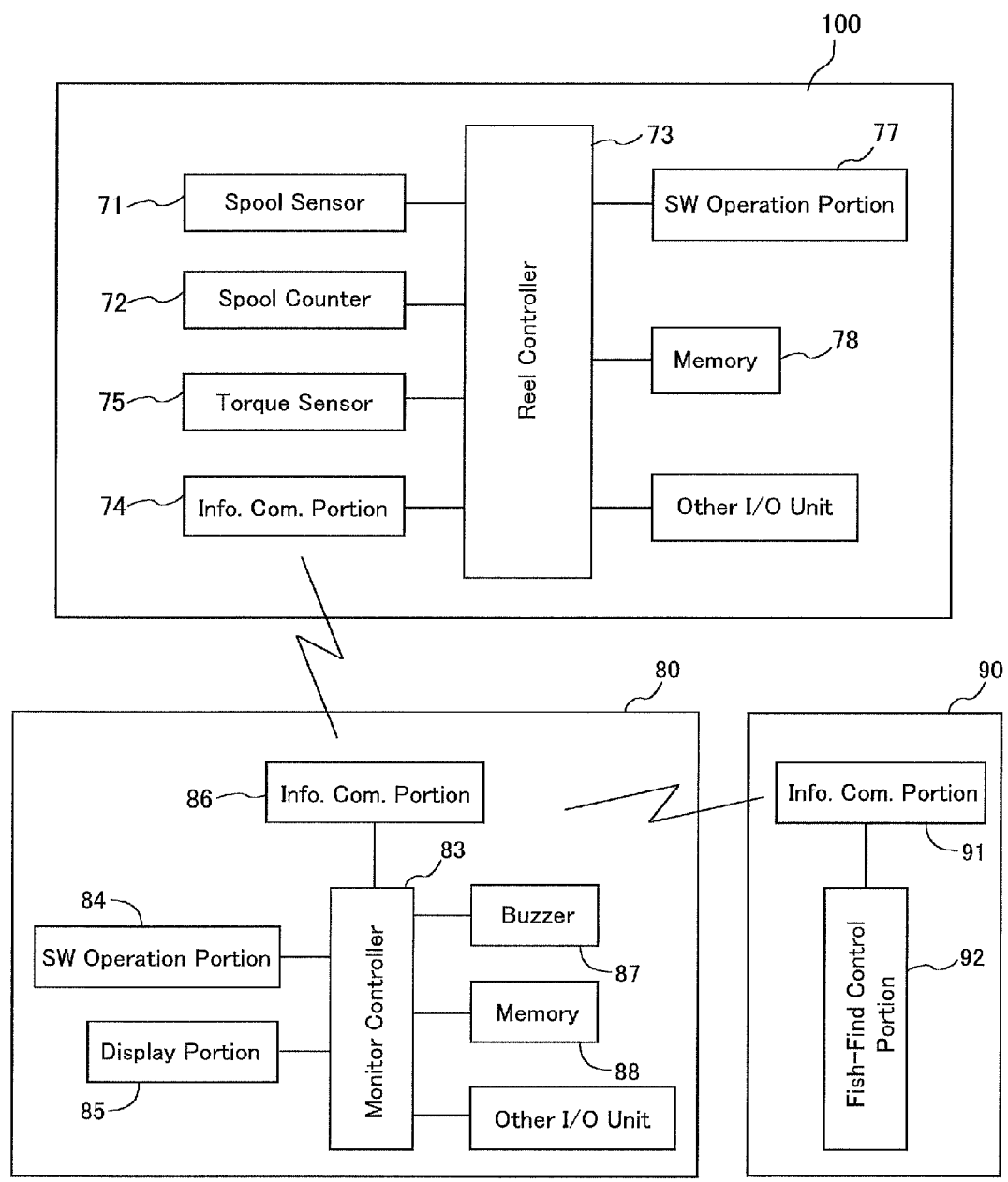
FIG. 8 is a control block diagram of the fishing reel and a fishing information display system in accordance with the embodiment of the present invention.

As shown in FIG. 8, a reel controller 73 which controls various interfaces including the information communication portion 74 and the switch operation portion 77 is provided inside the first side plate 10 of the reel unit 1. A spool sensor 71, a spool counter 72, the information communication portion 74, a torque sensor 75, and a battery (not shown) such as a condenser battery for supplying electric power to the reel controller 73 and the information communication portion 74 are provided inside the first side plate 10.

The reel controller 73 includes a microcomputer that includes a CPU, a RAM, a ROM, an I/O interface, and the like, which are provided inside the first side plate 10. The reel controller 73 carries out various control operations in accordance with pre-stored control programs, such as controlling the information communication portion 74. As shown in FIG. 8, the reel controller 73 is operatively coupled to the spool sensor 71 and the spool counter 72 for detecting the rotary direction and the number of rotations (rotational position data) of spool 3. The reel controller 73 is also operatively coupled to the information communication portion 74, the torque sensor 75, the switch operation portion 77, a memory 78, and other input/output units.

The spool sensor 71 is composed of two lead switches arranged at front and rear positions. The lead switches detect two magnets mounted on a magnet wheel. The spool counter 72 counts detection pulses, and thus can detect the number of rotations of the spool 3. In addition, the rotary direction of the spool 3 can be detected based on which of the lead switches emits the detection pulse earlier.

The spool counter 72 calculates the number of times the spool sensor 71 is turned on and off, and rotation position data related to the number of spool rotations is obtained based on this calculated value. The number of rotations calculated by the spool counter 72 will decrease when the spool 3 rotates in the forward direction (the rotation in the line releasing direction), and will increase when the spool 3 rotates in the opposite direction.

Figure 7:
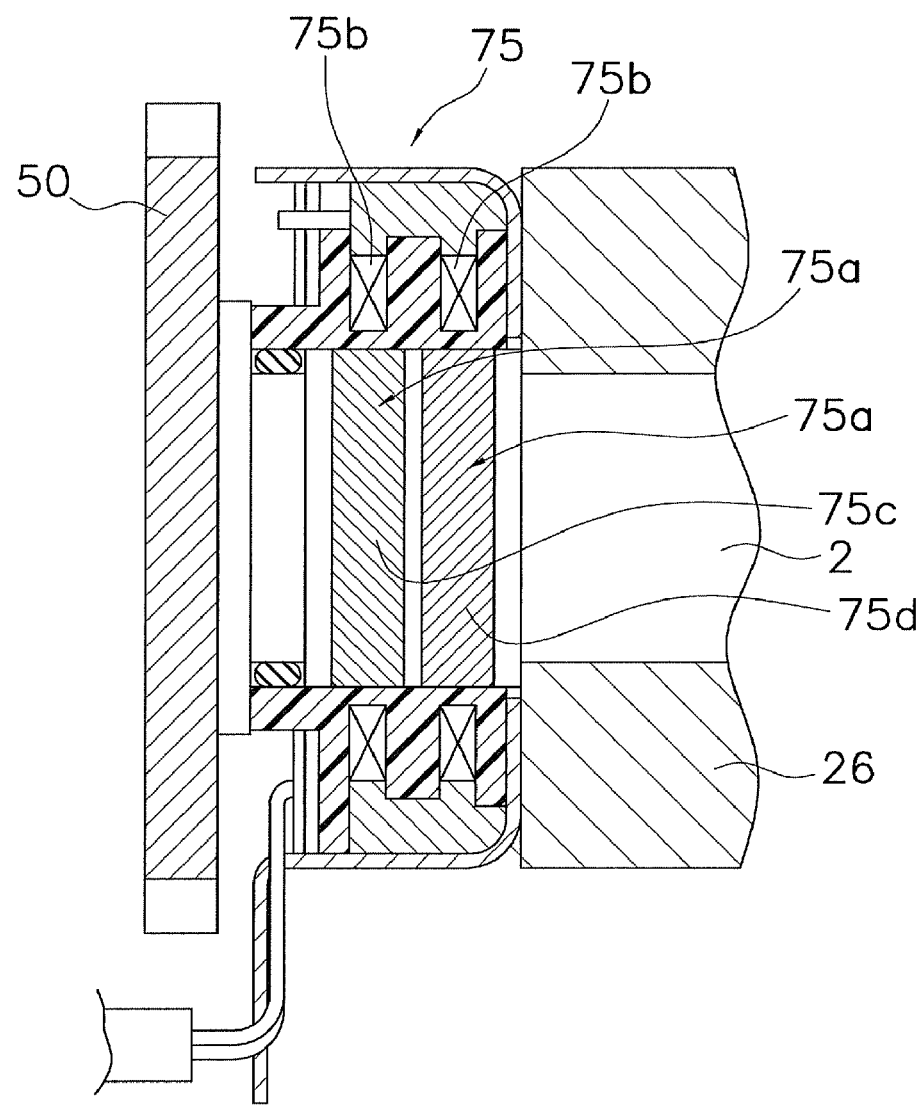
FIG. 7 is an enlarged cross-sectional view of a torque sensor in accordance with the embodiment of the present invention.

As shown in FIGS. 2 and 5, the torque sensor 75 is of a magnetostrictive type attached to the spool shaft 2 between the friction disk 26 and the ratchet wheel 50. As shown in the enlarged view of FIG. 7, the torque sensor 75 has magnetostrictors 75a attached to the spool shaft 2, and a detection coil 75b disposed around the magnetostrictor 75a. The magnetostrictors 75a are composed of soft magnetic material, such as amorphous alloy foil, and are wound and secured to the spool shaft 2 with a space between each other. The concave grooves 75c and 75d, which are slanted at different angles to provide magnetic anisotropy, are formed on the surface of magnetostrictor 75a. The detection coil 75b is formed in a cylindrical shape so as to surround the magnetostrictor 75a. The self-inductance varies according to variation of the magnetic permeability of the magnetostrictor 75a due to the torsion of the spool shaft 2. This detection coil 75b is connected to the reel controller 73 (see FIG. 8).

The reel controller 73 performs various kinds of control, such as controlling the information communication portion 74, and performs water depth calculation processing for obtaining the information on the water depth of terminal tackle. In the water depth calculation processing, the information on the water depth of terminal tackle is converted from the number of rotations of the spool 3 by corresponding the number of rotations of the spool 3 counted by the spool counter 72 to map data stored in the memory 78. The obtained information on the water depth of terminal tackle is transmitted to the information communication portion 74 as numerical data.

The reel controller 73 performs rotational speed calculation processing for calculating the rotational speed of the spool 3. In the rotational speed calculation processing, the rotational speed of the spool 3 in unit time is calculated based on the number of rotations of the spool 3 counted by the spool counter 72, and time information obtained from an internal clock of the reel controller 73. The obtained information on the rotational speed of the spool 3 is transmitted to the information communication portion 74 as numerical data.

The reel controller 73 performs the tension calculation processing for converting the torque of the spool shaft 2 detected by the torque sensor 75 into the tension applied to fishing line. In the tension calculation processing, the torque applied to the spool 3 is calculated from the torque of the spool shaft 2 based on the diameter, friction, and the like, of the spool 2 and the lever drag mechanism 7, and is corrected according to the spool bobbin diameter. The tension applied to fishing line is thus calculated. The obtained tension applied to fishing line is transmitted to the information communication portion 74 as numerical data.

The information communication portion 74 can transmit/receive various kinds of information to/from an information communication portion 86 of the fishing information display apparatus 80, which is provided separate from the fishing reel 100, as shown in FIG. 8. The information communication portion 74 is a low-power device, which employs a wireless method usable in a boat for transmission/reception in a relatively small area such as UWB (Ultra Wideband). The information communication portion 74 can transmit the information on the water depth of terminal tackle, the information on the rotational speed of the spool 3, and the information on the tension applied to fishing line, to the information communication portion 86 of the fishing information display apparatus 80. In addition, the information communication portion 74 can receive command information transmitted from the information communication portion 86 of the fishing information display apparatus 80, and transmit various kinds of information via the reel controller 73 based on this command information. In the information communication portion 74, as shown in FIGS. 1 and 2, the whole unit containing the antenna exposed externally of the first side plate 10 is covered with a case member made of synthetic resin.

The switch operation portion 77 is a push type toggle switch for turning the information communication portion 74 ON/OFF. When an angler turns the switch operation portion 77 ON, wireless communication becomes available. When the angler turns the switch operation portion 77 OFF, wireless communication becomes unavailable. The switch operation portion 77 is disposed near the rear of the information communication portion 74 in the upper part of the first side plate 10. The switch operation portion 77 is provided with a power-saving mode, which automatically turns power supply OFF when the information communication portion 74 does not perform transmission/reception long time. In this case, the information communication portion 74 can turn OFF, without the angler turning the switch operation portion 77 OFF.

The memory 78 is composed of a non-volatilized memory, such as EEPROM, and stores various kinds of data, such as the map data used in calculation of the length of fishing line.

Fishing Information Display Apparatus 80

The fishing information display apparatus 80 can display an echo image of the floor of fishing area and the water depth of a school of fish, which are acquired by a later-described fish finder 90, as shown in FIG. 8. In addition, the fishing information display apparatus 80 can display an image in which the information on the water depth of terminal tackle obtained from the fishing reel 100 is overlaid on the echo image of the water depth of the floor and the fish water depth. In order to allow a navigator away from the angler to watch the fishing information display apparatus 80, the fishing information display apparatus 80 is provided in navigator's room.

Figure 9:
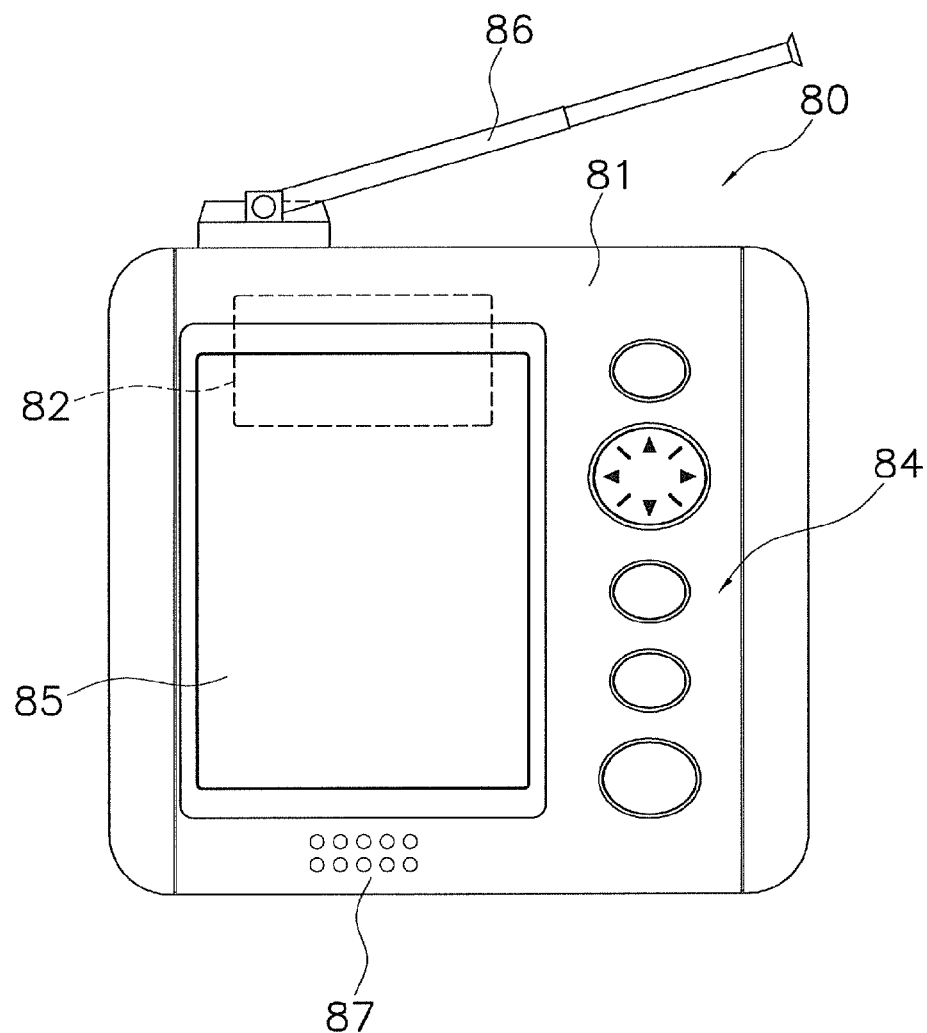
FIG. 9 is a plane view of the fishing information display apparatus in accordance with the embodiment of the present invention.

As shown in FIG. 9, a fishing information display apparatus 80 has a substantially rectangular solid shaped upright type body member 81, the information communication portion 86 provided in the upper part of the body member 81, a display portion 85 composed of liquid crystal display attached to the body member 81, and the switch operation portion 84 composed of a plurality of manual operation buttons provided in the right side beside the display portion 85.

As shown in FIG. 9, a battery 82, such as a storage battery for supplying electric power to the information communication portion 86 and so on, is provided in the internal upper part of the fishing information display apparatus 80. A buzzer 87 for emitting alarms to report various kinds of information is provided in the internal lower part of the fishing information display apparatus 80. A monitor controller 83 for various kinds of control is provided inside the fishing information display apparatus 80, as shown in FIG. 8.

The monitor controller 83 includes a microcomputer that includes a CPU, a RAM, a ROM, an I/O interface, and the like, which are provided inside the body member 81. The monitor controller 83 carries out various control operations of the information communication portion 86 in accordance with a control program, such as controlling display of the information from the fishing reel 100 and the fish finder 90 on the display portion 85, and transmitting various kinds of command information to the fishing reel 100. The monitor controller 83 is connected to various kinds of switches of the switch operation portion 84, the display portion 85, the information communication portion 86, the buzzer 87, the memory 88, and other input/output units, as shown in FIG. 8.

A plurality of buttons, such as a cursor key for vertically and horizontally moving a cursor in various kinds of setting options, a power button for turning the display on the display portion 85 ON/OFF, an enter button for setting various kinds of settings, and a display switching button, are arranged in the vertical direction in the switch operation portion 84, as shown in FIG. 9.

Figure 10:
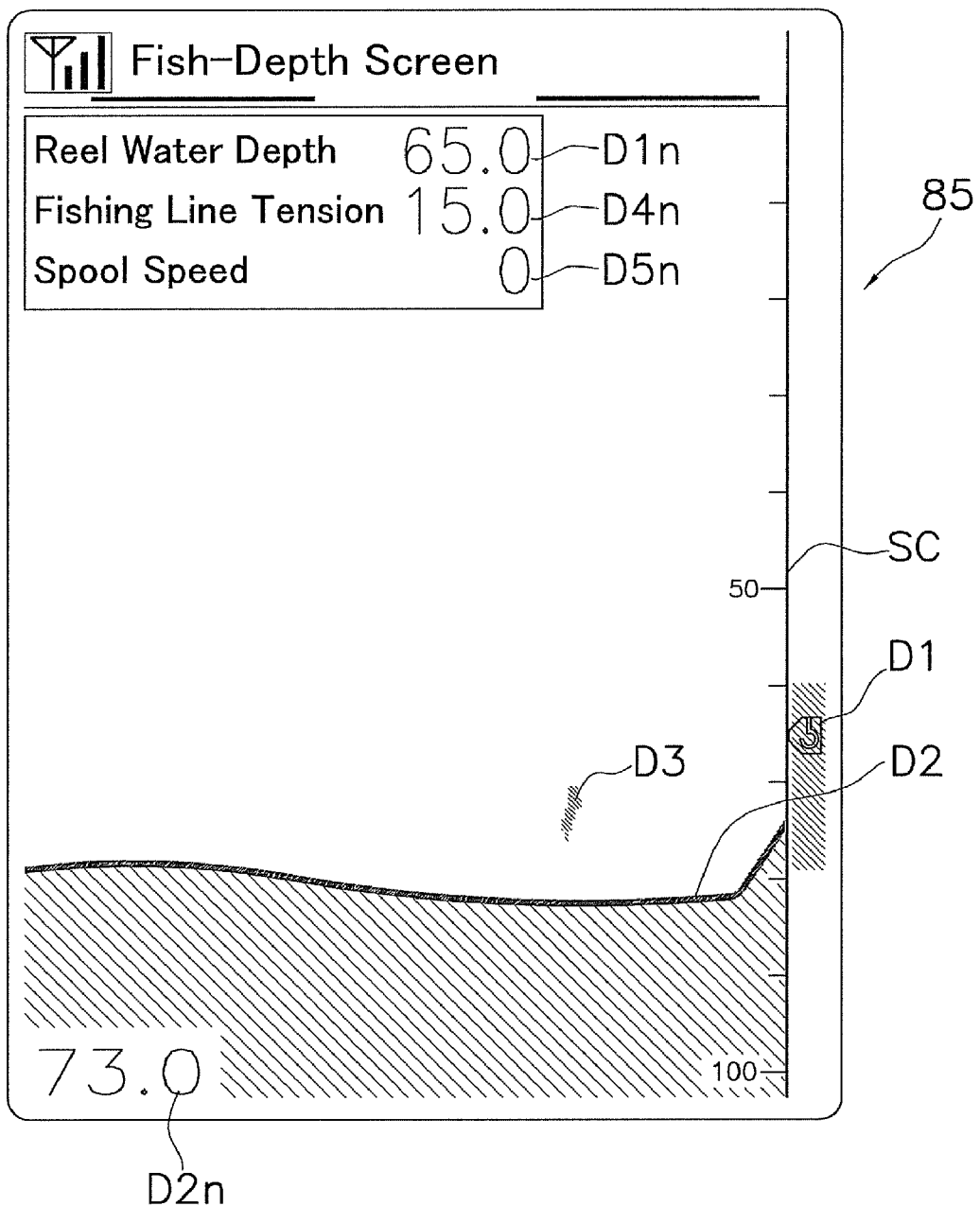
FIG. 10 is a view showing a screen of a display portion of the fishing information display apparatus in accordance with the embodiment of the present invention.

As shown in FIG. 9, the display portion 85 is a dot-matrix type liquid crystal display, and can display a large amount of various kinds of information. As shown in the enlarged view of FIG. 10, the display portion 85 displays a scale SC of water depth at the right end of the screen, and displays the water depth data D1 of the terminal tackle, which is acquired from the fishing reel 100, on the right side beside the scale SC. The water depth data D1 is displayed as, for example, a fishhook symbolizing the terminal tackle, at a position corresponding to its water depth. Furthermore, the display portion 85 displays the water depth data D2 of the sea floor and the water depth data D3 of fish water depth, which are received from the fish finder 90, as an echo image data at the positions corresponding to the respective water depths on the left side of the scale SC in a time-series manner. Moreover, the display portion 85 displays a numerical value D2$n$ of the water depth data D2 of the sea floor on the lower left part of the screen, and displays a numerical value D1$n$ of the water depth data D1 on the upper left part of the screen. In the upper left part of the screen, a value D4$n$ of data of the tension applied to fishing line and a value D5$n$ of the rotational speed data of the spool 3 are displayed in real time under the value D1$n$ of the water depth data D1.

The information communication portion 86 can wirelessly transmit/receive various kinds of information to/from the information communication portion 74 of the fishing reel 100 and the information communication portion 91 of the fish finder 90, as shown in FIG. 8. The information communication portion 86 is a low-power device, which employs a wireless method usable in a boat for transmission/reception to/from the information communication portion 74 of the fishing reel 100 and the information communication portion 91 of the fish finder 90, in a relatively small area such as UWB (Ultra Wideband). The information communication portion 86 is set to have different communication channels for the information communication portion 74 and the information communication portion 91. Thus, interferences between the information communication portion 74 and the information communication portion 91 do not occur. The information communication portion 86 receives information, such as water depth data of the terminal tackle, information on the rotational speed of spool 3, and information on the tension applied to fishing line, from the information communication portion 74 of the fishing reel 100, and transmits various kinds of command information to the information communication portion 74 of the fishing reel 100. The information communication portion 86 can communicate with the information communication portion 91 of the fish finder 90, and receives information such as the water depth of the floor, the position of the school of fish. As shown in FIG. 9, the information communication portion 86 is provided in the upper part of the body member 81, and has a telescopic, rotatable antenna made of metal.

As shown in FIG. 9, the buzzer 87 has a speaker in the lower part of the body member 81, and emits various kinds of alarm sounds and click sounds.

The memory 88 is composed of a nonvolatile memory, such as EEPROM, and can store various kinds of data received from the fishing reel 100 and the fish finder 90. Accordingly, the user can consult past information, or display historical data via the monitor controller 83.

Fish Finder 90

The fish finder 90 is a device that collects information showing the fish water depth of the fish, the situation of the school of fish, and the travel direction of the school of fish. As shown in FIG. 8, the fish finder 90 has the information communication portion 91 that wirelessly communicates the information on the school of fish to the information communication portion 86 of the fishing information display apparatus 80, and the fish-finding controller 92 that is connected to the information communication portion 91 and performs various kinds of control. The information communication portion 91 is a low-power device, which employs a wireless method usable in a boat for transmission/reception in a relatively small area such as UWB (Ultra Wideband). Other construction of the fish finder 90 is the same as other known fish finders. Thus, the description of other construction of the fish finder 90 is omitted.

When the angler conducts fishing by using these fishing information display apparatus 80 and fish finder 90, first, the angler turns the switch operation portion 77 of the fishing reel 100 ON, and thus brings the information communication portion 74 to the state capable of wireless communication. As for the fishing information display apparatus 80 and the fish finder 90, the power switches are turned ON, and various kinds of setting operations are performed, thus, the information communication portions 86 and 91 are brought to the state capable of wirelessly communicating with one another or with the information communication portion 74. In this case, when the information communication portion 74 of the fishing reel 100 and the information communication portion 86 of the fishing information display apparatus 80 are wirelessly connected to each other, the information communication portion 74 and the information communication portion 86 are in the standby state and waiting for various kinds of control commands. When command information (transmission request) for requesting transmission of information on the water depth of terminal tackle, information on the rotational speed of spool 3, and information on the tension applied to fishing line is transmitted from the information communication portion 86 to the information communication portion 74, the information on the water depth of terminal tackle, the information on the rotational speed of spool 3, and the information on the tension applied to fishing line are transmitted from the information communication portion 74 to the information communication portion 86. Thus, the information on the water depth of terminal tackle, the information on the rotational speed of spool 3, and the information on the tension applied to fishing line are displayed on the display portion 85 via the monitor controller 83. On the other hand, information on the school of fish acquired from the fish finder 90 is transmitted from the information communication portion 91 to the information communication portion 86, and is graphically displayed on the display portion 85 with the information on the water depth of terminal tackle via the monitor controller 83.

In this fishing reel 100, while the angler trails the terminal tackle through the water in trolling, the navigator can know the information on the water depth of terminal tackle, the information on the rotational speed of spool 3, and the information on the tension applied to fishing line from the fishing information display apparatus 80 in real time. Therefore, the navigator can certainly know information whether a fish strikes, a current fishing situation, and the condition of pull of a fish. Thus it is possible to change the boat speed or the travel direction of the boat easily according to the fishing situation.

Figure 13:
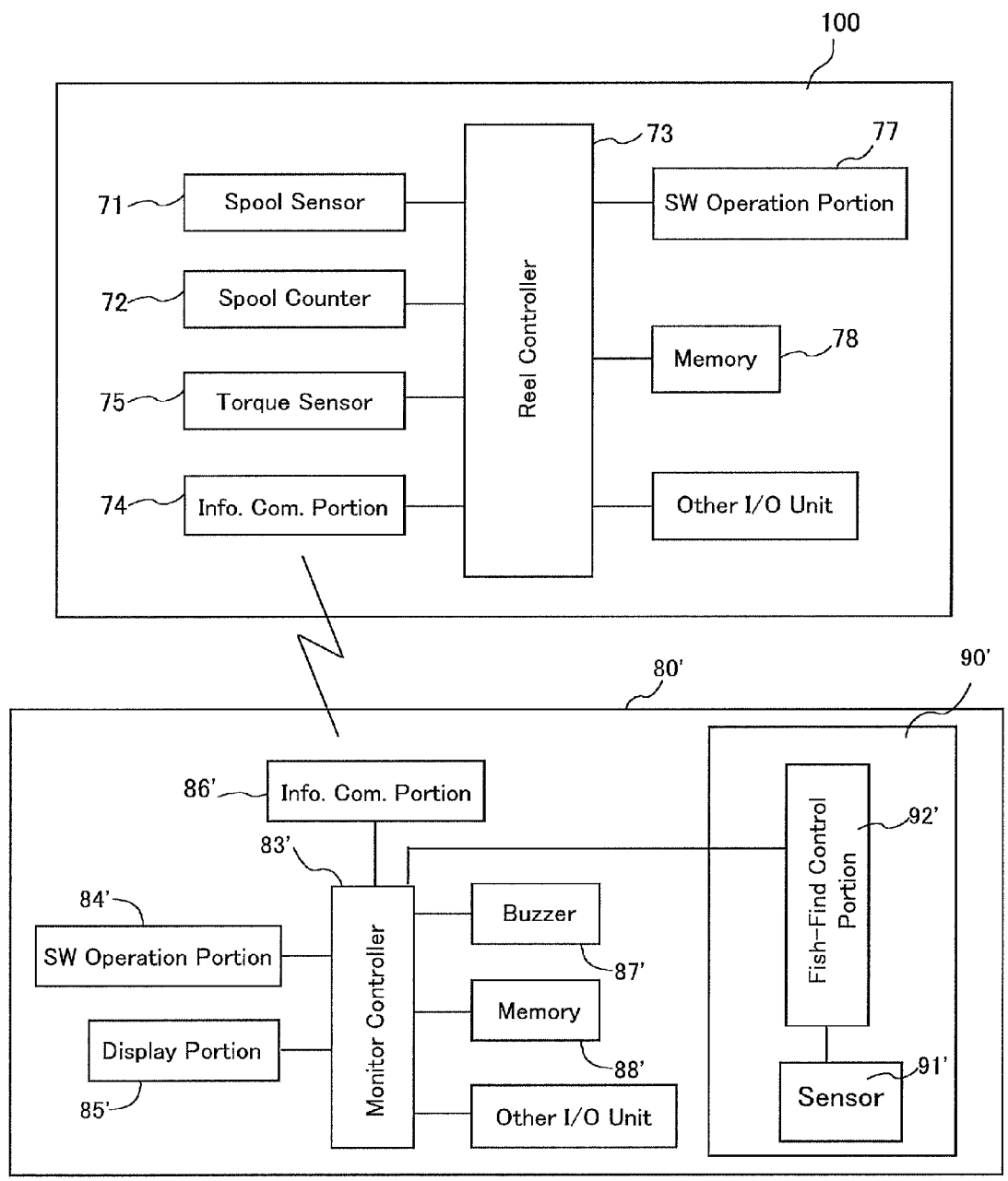
FIG. 13 is a control block diagram of the fishing reel and a fishing information display system in accordance with still another embodiment of the present invention.

Other Embodiments (a) Although the fishing information display apparatus 80 is used as an example of a display provided externally of the fishing reel 100 in the foregoing embodiment, other information terminals having display portion, such as a cellular telephone, a potable game device, PDA (Personal Digital Assistants), and a note type PC may be used. Also, the fishing information display apparatus 80 that displays the information acquired from the fish finder 90 may also display information from a global positioning system (GPS) installed in the fishing boat. Alternatively, the fishing information display apparatus 80 may display only information acquired from the fishing reel 100. In addition, the fishing information display apparatus 80 may be configured to be wirelessly connected to a plurality of fishing reels 100, and to display the respective various kinds of information obtained from the plurality of fishing reels 100. Moreover, a small fish finder 90 that can wirelessly communicate with the fishing reel 100 may be used as the display provided externally of the fishing reel 100. In other words, a fishing information display 80' may be integrated with a fish finder 90', as shown in FIG. 13.

(b) Although the battery, such as a condenser battery, which supplies electric power to the information communication portion 74 of the fishing reel 100, is provided inside of the second side plate 11 in the foregoing embodiment, the present invention is not limited to such construction. For example, a button battery may be alternatively attached inside the reel unit 1 (at least one of the reel body 12, the first side plate 10, and the second side plate 11), or a solar cell may be mounted to the exterior of the reel unit 1, to supply electric power. Furthermore, electric power may be supplied by connecting a code from a battery provided externally of the reel unit 1. Moreover, the power generator for generating electric power by rotation of spool 3 may be additionally provided, such that this power generator can supply electric power. In the case where the solar cell or the power generator supplies electric power, electric power may be temporally stored in a condenser battery, such as a capacitor, such that electric power can be stably supplied.

Figure 11:
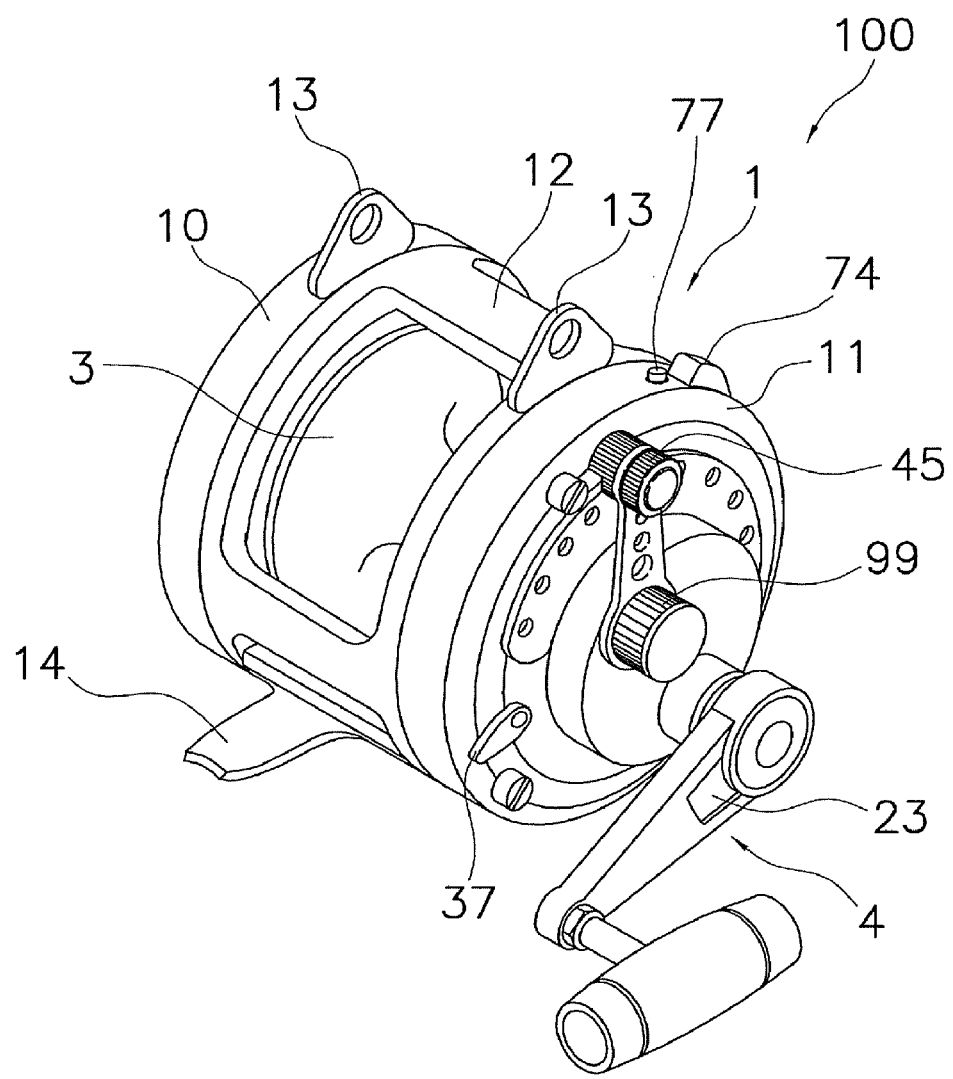
FIG. 11 is a perspective view of a fishing reel in accordance with another embodiment of the present invention.

(c) Although the information communication portion 74 is disposed in the front part of the first side plate 10 of the reel unit 1 in the foregoing embodiment, it also may be disposed in the second side plate 11 of the reel unit 1, as shown in FIG. 11. The information communication portion 74, which is provided so as to be exposed externally of the first side plate 10 in the foregoing embodiment, may be accommodated inside the first side plate 10, or may have a structure detachable from the first side plate 10. Moreover, although the information communication portion 74 is covered with a case member made of synthetic resin in the foregoing embodiment, the present invention is not limited to such construction. For example, a telescopic, rotatable antenna made of metal with directivity may be used as the information communication portion.

(d) Although UWB (Ultra Wideband) is used as a wireless communication method for the information communication portion 74 in the foregoing embodiment, the present invention is not limited to such construction. Other wireless communication methods, such as Bluetooth, certain low-power radio communications, infrared transmissions, may also be used. Moreover, although the information communication portion 74 performs both transmission and reception in the foregoing embodiment, it may perform only transmission. In this case, the information communication portion 86 of the fishing information display apparatus 80 may perform only reception.

(e) Although the switch operation portion 77 for turning the information communication portion 74 ON/OFF is provided on the upper part of the first side plate 10 of the fishing reel 100 in the foregoing embodiment, it may be provided on the side of the first side plate 10, or in the first side plate 10 side. Furthermore, the switch operation portion 84 of the fishing information display apparatus 80 may be configured to turn the information communication portion 74 ON/OFF without providing the switch operation portion 77 in the fishing reel 100. Alternatively, the switch operation portions may be provided both for the fishing reel 100 and the fishing information display apparatus 80. Moreover, the switch operation portion 77 is not limited to the push type toggle switch, but it may be a slide-type switch with waterproof structure, for example.

Figure 12:
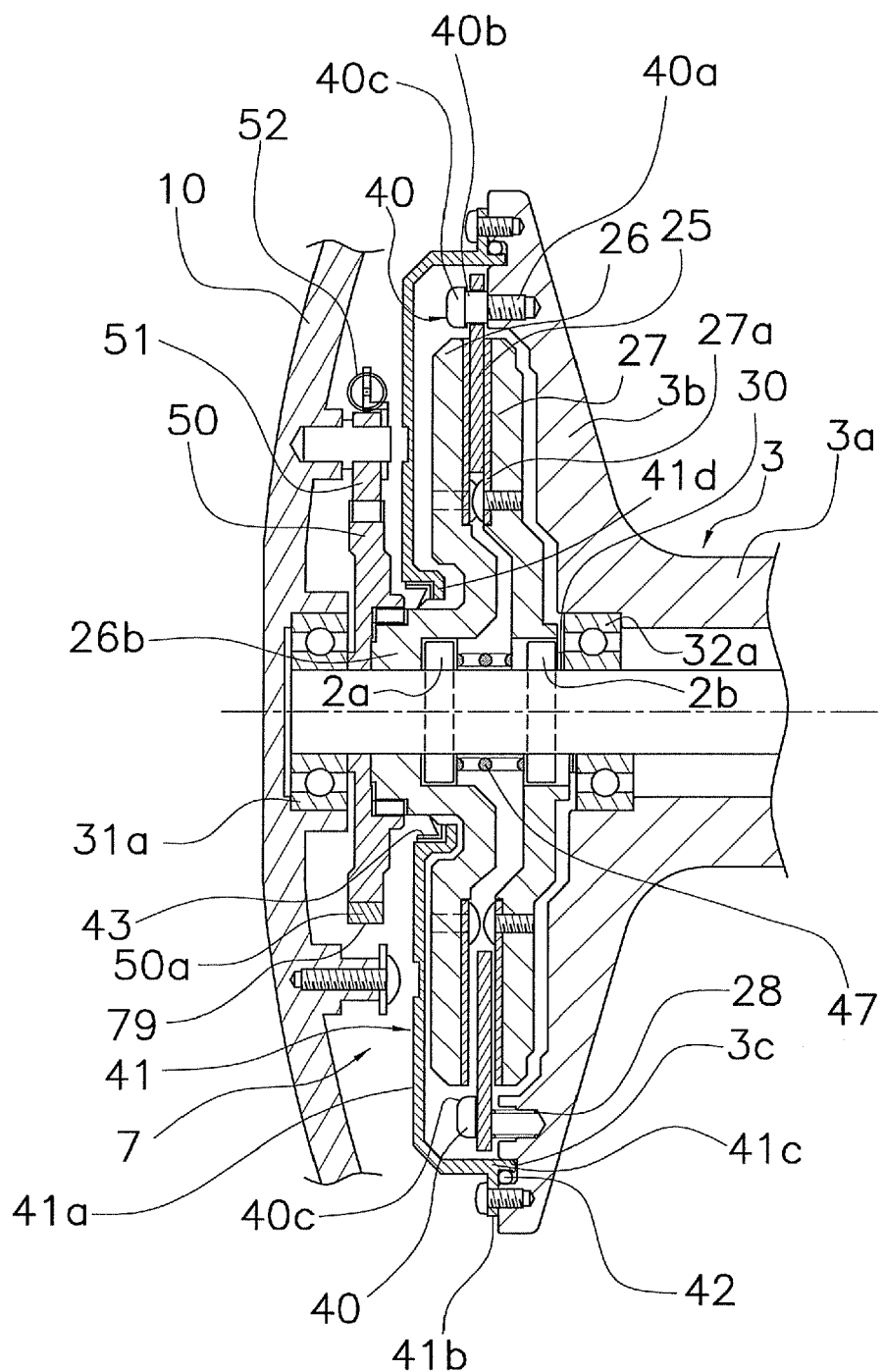
FIG. 12 is a cross-sectional enlarged view of the left part of the fishing reel in accordance with still another embodiment of the present invention.

(f) Although the torque sensor 75 is attached to the spool shaft 2 between the friction disk 26 and the ratchet wheel 50 in the foregoing embodiment, the present invention is not limited to such construction. The torque sensor 75 may be attached to other part of the spool shaft 2, or the handle shaft 5, the lever drag mechanism 7, or the like. Furthermore, the tension detection portion of the present invention is not limited to the torque sensor 75. Instead, a piezo-electric element 79 may be disposed on the tooth portion of the ratchet wheel 50 as shown in FIG. 12, such that the piezo-electric element 79 detects distortion. Moreover, a strain sensor may be provided instead of the piezo-electric element 79.

According to the present invention, a fishing reel is provided with a tension detection portion that detects tension applied to fishing line, and a tension output portion that can externally output the detected the tension that is applied to fishing line. Therefore, a navigator can certainly know the current fishing situation from the tension applied to fishing line.

As used herein, the following directional terms "forward, rearward, above, downward, vertical, horizontal, below and transverse" as well as any other similar directional terms refer to those directions of a device equipped with the present invention. Accordingly, these terms, as utilized to describe the present invention should be interpreted relative to a device equipped with the present invention.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A fishing information display apparatus provided externally of a fishing reel that is adapted to be attached to a fishing rod, the fishing information display apparatus being configured to receive data communicated from the fishing reel, the fishing information display apparatus comprising:
   a body member;
   a display portion provided in the body member;
   a communication portion receiving tension data from the fishing reel of tension applied to the fishing line, and the communication portion receiving rotational speed data of a spool of the fishing reel; and
   a controller displaying on the display portion the tension data received from the fishing reel, and the controller displaying on the display portion the rotational speed data of the spool.

2. A fishing information display apparatus provided externally of a fishing reel that is adapted to be attached to a fishing rod, the fishing information display apparatus being configured to receive data communicated from the fishing reel, the fishing information display apparatus comprising:
   a body member;
   a display portion provided in the body member;
   a communication portion receiving tension data from the fishing reel of tension applied to the fishing line, and the communication portion receiving from the fishing reel water depth data of a terminal tackle attached to fishing line when the terminal tackle is submerged; and
   a controller displaying on the display portion the tension data received from the fishing reel, and the controller displaying on the display portion the water depth data of the terminal tackle.

3. The fishing information display apparatus as set forth in claim 2, wherein
   the communication portion receives data from a fish finder that is provided externally of the fishing information display apparatus, and
   the controller displays on the display portion the data from the fish finder.

4. The fishing information display apparatus as set forth in claim 3, further comprising
   a fish finder portion that obtains fish location data,
   wherein the controller displays on the display portion the fish location data from the fish finder portion.

5. A fishing information display system, comprising:
   a plurality of fishing reels each being attached to a fishing rod to wind and to release a fishing line, each of the plurality of fishing reels including
      a reel unit being mounted on the fishing rod,
      a spool being rotatably attached to the reel unit, the fishing line being adapted to be wound around the spool,
      a handle being provided in the reel unit to rotate the spool,
      a tension detector detecting tension applied to the fishing line, and
      a first communication portion transmitting tension data applied to the fishing line detected by the tension detector; and
   a fishing information display apparatus being provided externally of the plurality of fishing reels, and receiving data communicated from the plurality of fishing reels, the fishing information display apparatus including
      a body member,
      a display portion being provided in the body member,
      a second communication portion receiving tension data from the plurality of fishing reels of tension applied to a respective fishing line, and
      a controller displaying on the display portion the tension data received from the plurality of fishing reels.

* * * * *